J. C. ANDERSON.
SPEED INDICATOR.
APPLICATION FILED JAN. 21, 1916.

1,233,011.

Patented July 10, 1917.
2 SHEETS—SHEET 1.

Witnesses
Frederick L. Fox,
R. M. Smith.

Inventor
J. C. Anderson
By Victor J. Evans.
Attorney

J. C. ANDERSON.
SPEED INDICATOR.
APPLICATION FILED JAN. 21, 1916.

1,233,011.

Patented July 10, 1917.
2 SHEETS—SHEET 2.

Witnesses
Frederick L. Fox,
R. M. Smith

Inventor
J. C. Anderson.

By Victor J. Evans.
Attorney

UNITED STATES PATENT OFFICE.

JEREMIAH C. ANDERSON, OF WOONSOCKET, SOUTH DAKOTA.

SPEED-INDICATOR.

1,233,011. Specification of Letters Patent. Patented July 10, 1917.

Application filed January 21, 1916. Serial No. 73,497.

*To all whom it may concern:*

Be it known that I, JEREMIAH C. ANDERSON, a citizen of the United States, residing at Woonsocket, in the county of Sanborn and State of South Dakota, have invented new and useful Improvements in Speed-Indicators, of which the following is a specification.

This invention relates to speed indicators for any machine requiring a certain constant speed, such as cream separators and the like, the object of the present invention being to produce simple and reliable speed indicating mechanism in which certain parts thereof are adjustable for the purpose of rendering the device as a whole accurate in the readings thereof.

With the above and other objects in view, the invention consists in the novel construction, combination and arrangement of parts, as herein described, illustrated and claimed.

In the accompanying drawings:—

Fig. 4 is a similar view of the governor slide.

Figure 1:
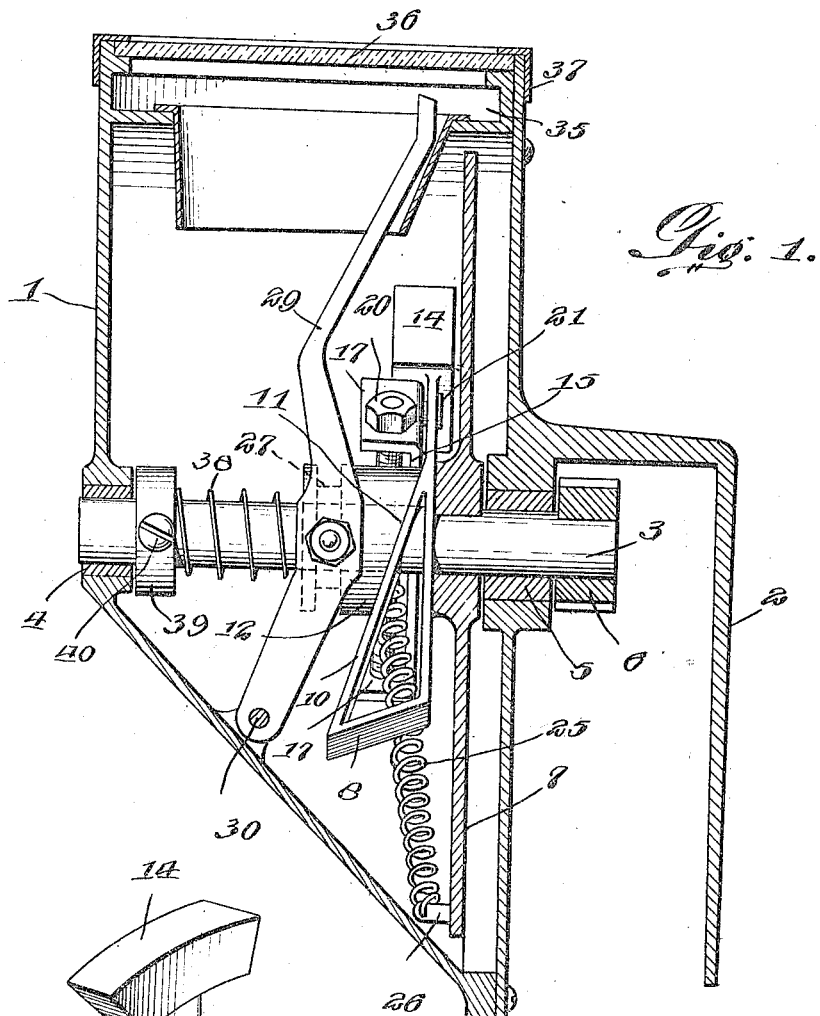
Figure 1 is a sectional view of the speed indicator of this invention showing the operating shaft and certain other parts in elevation.
Figure 2:
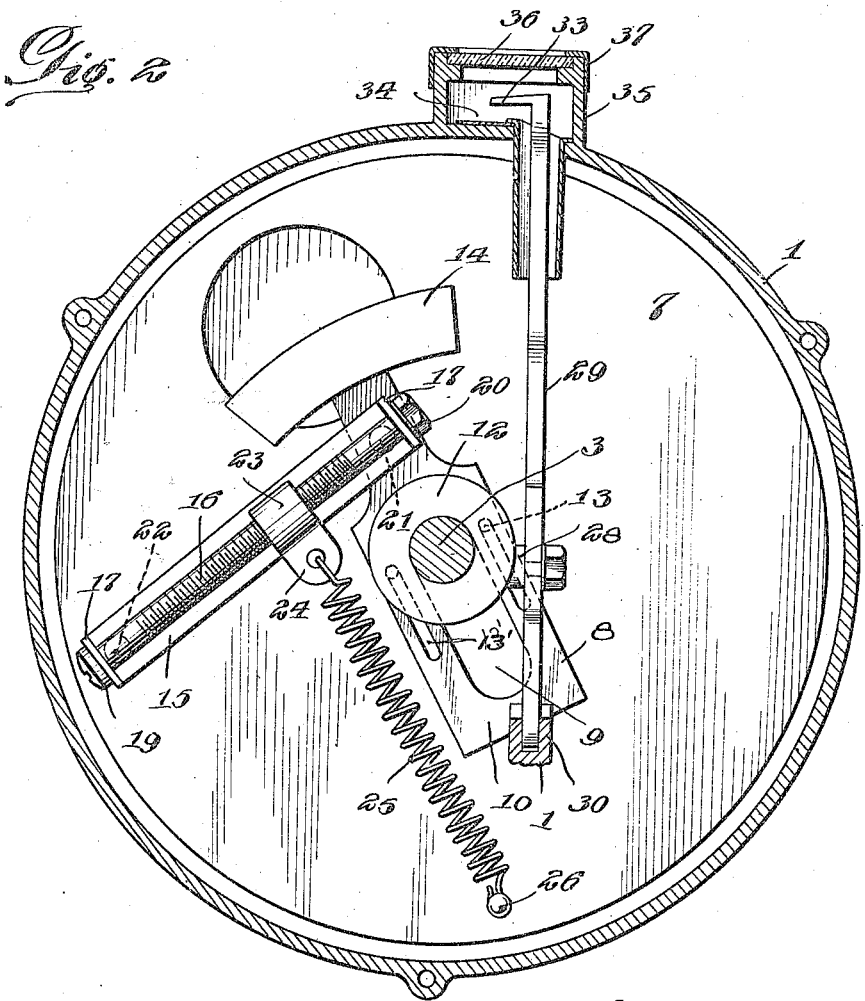
Fig. 2 is a sectional view taken at right angles to Fig. 1 and extending transversely through the operating shaft.
Figure 3:
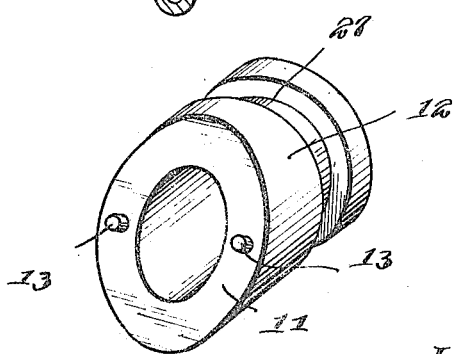
Fig. 3 is a detail view of the sliding collar.

The speed indicator contemplated in this invention comprises a casing 1 of suitable shape to contain the mechanism hereinafter described. Said casing is also provided with an extension 2 adapted to receive and house the driving gear of a machine such as a cream separator, also enabling the complete housing 1 and 2 to be fastened in fixed relation to the machine in connection with which the speed indicator is used.

3 designates a rotary shaft which actuates the indicating mechanism, the shaft 3 being journaled in bearings 4 and 5 within the casing and provided at one end with a pinion 6 which receives its motion from the gear of the cream separator or other machine.

Within the casing is mounted a rotary disk-shaped carrier 7 on which the main elements of the indicating mechanism are mounted as will appear. 8 represents a governor slide provided with a longitudinal slot 9 therein and also provided with an oblique or wedgelike face 10 as shown in Figs. 1 and 4, the face 10 coöperating with a corresponding oblique face 11 on a slide collar 12 which is mounted on the shaft 3 and provided with lugs 13 which engage slots 13′ the governor slide 8 so that said parts revolve together and with the shaft 3 and the carrier 7. The slide 8 is provided at one end with a weight 14 so that as the carrier 7 revolves, the weight 14 is acted upon by centrifugal force, thereby causing a sliding movement of the member 10 transversely of the shaft 3. 15 designates an arm or link which carries an adjusting screw 16, the ends of the link 15 being bent to form bearings 17 for the opposite ends of the adjusting screw 16 and the latter being provided at one end with a notched head 19 adapting the same to be revolved by means of an ordinary screw driver. When properly adjusted, the screw 16 may be held stationary by means of a clamping nut 20 at the inner end thereof. The arm or link 15 is pivotally connected at 21 to the governor slide 8 and is pivotally connected at 22 to the rotary carrier 7. A nut 23 is threaded upon the screw 16 and is moved lengthwise thereof when said screw is turned. The nut 23 carries a projection or lug 24 having a hole to receive one extremity of a contractile spring 25 the other extermity of which is secured to a fixed stud or post 26. By shifting the nut 23, it is obvious that the tension of the spring 25 on the arm or link 15 and the governor slide 8 may be increased or diminished for the purpose of regulating the accuracy of the indicating mechanism.

The slide collar 12 is formed with an annular groove 27 in which works a lug or projection 28 on an indicating arm 29 which extends across the shaft 3 at one side thereof and is pivotally connected at 30 to the casing 1. The arm 29 is provided at its outer extremity with a pointer 33 which sweeps over a graduated plate or dial 34 arranged within an extension chamber 35 closed at the upper side by a transparent panel 36 held in place by a binding frame 37. 38 designates a light expansion spring which is interposed between the slide collar 12 and a fixed collar 39 adjustable longitudinally of the shaft 3 by means of a set screw 40.

In operation, as the shaft 3 is revolved, the weight 14 moves outwardly under centrifugal action thereby shifting the governor slide and causing the oblique face 10 thereof to coöperate with the oblique face 11 of the slide collar. This gradually compresses the spring 38 and causes the lug or projection 28 carried by the indicating arm 29 to swing the latter on its pivotal connection 30 causing the pointer 33 to move over the graduated plate or dial 34 and thereby clearly indicate the speed or number of revolutions per minute of the driving shaft of the machine in connection with which the indicator is used.

Having thus described my invention, I claim:—

1. In a speed indicator, the combination of a casing, a rotary shaft journaled therein and provided with motion receiving means, a carrier mounted fast on said shaft, a slide collar movable longitudinally of said shaft and having an oblique end face, a speed indicating arm pivotally mounted in the casing connected with and actuated by said slide collar, means for resisting the sliding movement of said collar, a weighted centrifugally operable slide movable transversely of said shaft and having an oblique face which coöperates with the oblique face of said collar, and means for preventing rotative movement of said collar in relation to said slide.

2. In a speed regulator, the combination of a rotary shaft, a carrier fast on said shaft, a slide collar movable longitudinally of said shaft and having an oblique end face, a pivotally mounted speed indicating arm connected with said slide collar so as to be operated thereby, means for resisting the sliding movement of said collar, a weighted centrifugally operable slide movable transversely of said shaft and having an oblique face which coöperates with the oblique face of said collar, means for preventing rotative movement of said collar in relation to said slide, a link connected at one end to said governor slide and having a pivotal connection with said carrier, an adjusting screw journaled on and carried by said link, a nut movable lengthwise of said link and adapted to be shifted by a turning movement of said screw, and a spring attached at one end to said nut and at the other end to said carrier.

In testimony whereof I affix my signature in presence of two witnesses.

JERRY C. ANDERSON.

Witnesses:
CONNOR COONEY,
D. C. PENDEXTER.

Copies of this patent may be obtained for five cents each, by addressing the "Commissioner of Patents, Washington, D. C."